US011768937B1

(12) United States Patent
Ciubotariu

(10) Patent No.: US 11,768,937 B1
(45) Date of Patent: Sep. 26, 2023

(54) HASH BASED FLEXIBLE THREAT SCANNING ENGINE

(71) Applicant: Amazon Technologies, Inc., Seattle, WA (US)

(72) Inventor: Mircea Ciubotariu, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 17/106,798

(22) Filed: Nov. 30, 2020

(51) Int. Cl.
*G06F 21/52* (2013.01)
*G06F 21/56* (2013.01)
*G06F 16/14* (2019.01)
*G06F 16/13* (2019.01)

(52) U.S. Cl.
CPC .......... *G06F 21/565* (2013.01); *G06F 16/137* (2019.01); *G06F 16/152* (2019.01); *G06F 2221/034* (2013.01)

(58) Field of Classification Search
CPC .............. G06F 21/565; G06F 16/137; G06F 2221/034; G06F 16/152
See application file for complete search history.

(56) References Cited

U.S. PATENT DOCUMENTS

| 2018/0181300 | A1* | 6/2018 | Barndt | G06F 11/079 |
| 2019/0294358 | A1* | 9/2019 | Suzuki | G06F 3/064 |
| 2021/0034249 | A1* | 2/2021 | Armangau | G06F 3/0659 |
| 2021/0357364 | A1* | 11/2021 | Saliba | G06F 16/152 |

FOREIGN PATENT DOCUMENTS

CN 108733843 A * 11/2018

* cited by examiner

*Primary Examiner* — Ashokkumar B Patel
*Assistant Examiner* — William B Jones
(74) *Attorney, Agent, or Firm* — Nicholson De Vos Webster & Elliott LLP

(57) ABSTRACT

Techniques for hash based flexible scanning are described. A method of hash based flexible scanning may include obtaining a sample from a sample source, determining a size of the sample, generating one or more hashes of one or more blocks of the sample based on the size of the sample, and determining whether the sample is associated with a known threat by comparing the one hashes of the one or more blocks to hashes in a threat database.

13 Claims, 8 Drawing Sheets

HASH BASED FLEXIBLE THREAT SCANNING ENGINE

BACKGROUND

Malware scanning can be used to identify malicious software, such as computer viruses, on storage volumes. The easiest way to identify threat files is by hash, in which a hash is computed using a hashing algorithm for a file and compared to a threat list and/or safe list to determine whether the file is a known threat or a known clean file. Traditional hash-based systems generate an individual hash for each file. However, this requires computing trillions of hashes, some of which may correspond to large files, which is computationally expensive and difficult to scale.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for hash based flexible threat scanning According to some embodiments, hash based flexible threat scanning enables hashing portions of samples (e.g., files, memory dumps, or other data) and comparing these hashed portions with a threat database to determine whether an entire sample needs to be hashed for threat detection purposes. This improves scanning performance by reducing the amount of data for which a hash needs to be computed without a loss of security. Instead of computing full hashes for every sample, embodiments compute hashes of particular areas of a given sample (e.g., blocks), that could in turn match multiple samples, but only the samples of interest, without accidentally matching others, e.g. a block hash on a malware family should not trigger on clean samples. Experimentally, threats have been identified to cluster at the beginning and ends of samples. For example, a zip self-extractor may include an executable stub at the beginning of the file (e.g., a clean portion) and a malicious payload appended to the end of the file. This results in hashes of blocks from the beginning and end of malicious samples to have a much higher collision rate (e.g., due to having shared malicious data) than those of clean samples. As a result, a hash based flexible threat scanning service that focuses on scanning such blocks can identify malicious samples while processing only portions of the samples, and therefore saving the processing resources that would be required to process the entire samples.

Figure 1:
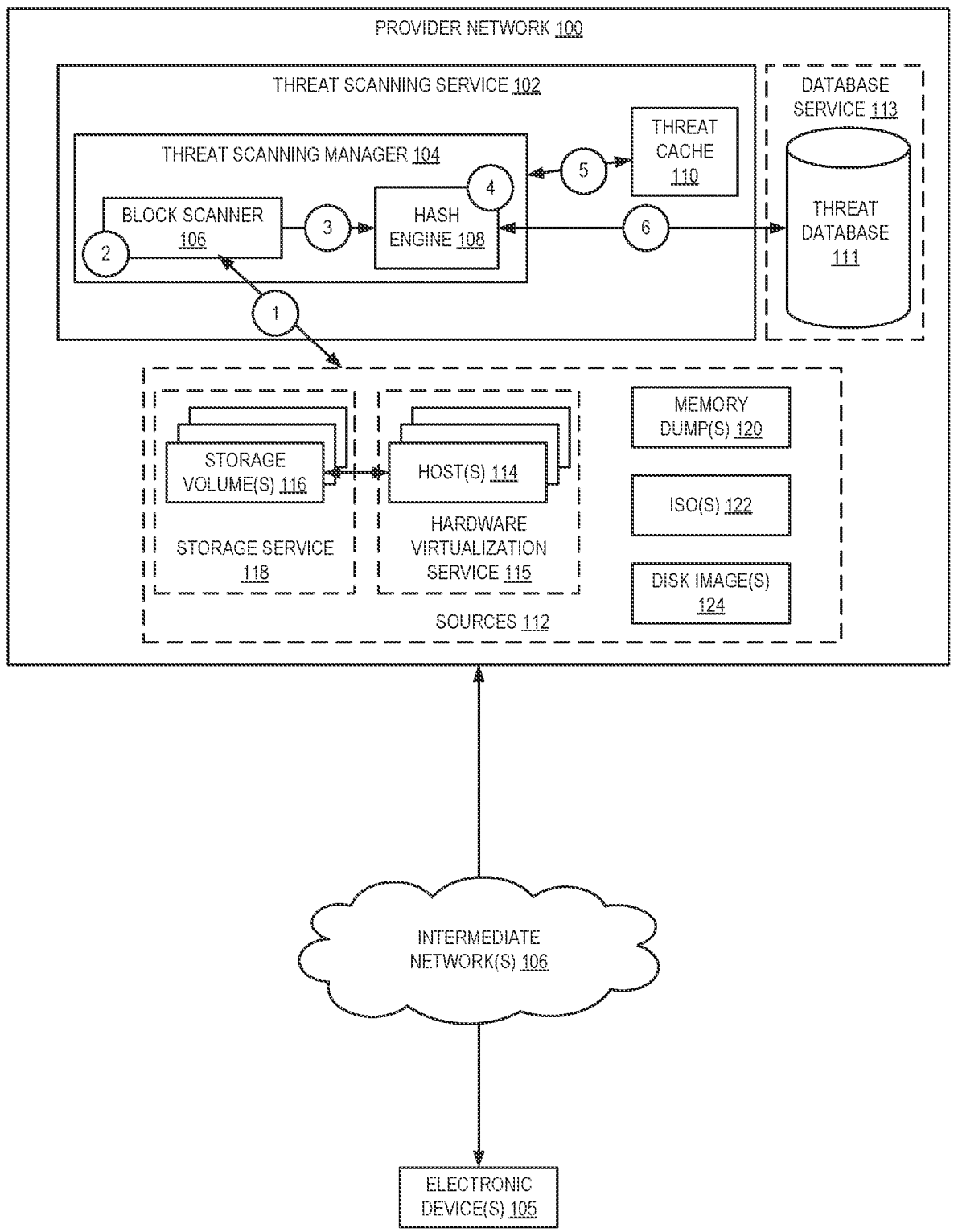
FIG. 1 is a diagram illustrating an environment for a hash based flexible threat scanning according to some embodiments.

FIG. 1 is a diagram illustrating an environment for a hash based flexible threat scanning according to some embodiments. As shown in FIG. 1, a provider network 100 includes threat scanning service 102. Threat scanning service 102 implements the hash based flexible threat scanning techniques described herein. In various embodiments, threat scanning service 102 scans samples from a plurality of sources, which may include customer resources, provider network resources, etc. The threat scanning service 102 can compute hashes for portions of the samples and compare these computed hashes to a threat database to identify malicious samples and excluded samples (e.g., those associated with a safe list). By reducing the total amount of data to be processed by the threat service 102, using hash based flexible threat scanning techniques, fewer provider resources are required to scan the data stored in provider network 100 while reducing the risk of infiltration by malicious code.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc., using one or more electronic devices 105. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The hardware virtualization service 115 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As shown in FIG. 1, threat scanning service 102 includes a threat scanning manager 104 and threat cache 110. Threat cache 110 can include a subset of threat hashes stored in threat database 111. For example, in some embodiments, threat cache is maintained in memory and includes the most recently checked threat entries and associated hashes. In some embodiments, threat cache 110 maintains the most frequently checked entries and hashes. Other optimization schemes may also be used to determine which entries and hashes are to be maintained in the threat cache to improve performance by reducing network calls to threat database 111. Threat scanning manager 104 can manager periodic and/or on-demand threat scanning of sources 112. Sources 112 can include various data sources from which samples can be scanned. For example, sources 112 can include a plurality of storage volumes 116 maintained by storage service 118. These storage volumes may be mounted to a plurality of hosts 114 provided by hardware virtualization service 115. Additionally, or alternatively, the sources may include memory dumps 120, ISO containers, 122, disk images 124, etc.

At numeral 1, block scanner 106 of threat scanning manager 104 can read one or more samples from one or more sources 112. As discussed, this may include one or more files, memory dumps, disk images, etc. At numeral 2, the block scanner then determines which blocks of the samples are to be hashed based on characteristics of the samples. For example, depending on the size of a given sample, only particular blocks may be hashed. As a result, a small sample may have a full hash computed while a large sample may only have a few blocks from the beginning and/or end of the sample computed. Once the block scanner has identified the blocks to be hashed, these blocks are provided to hash engine 108, at numeral 3. In some embodiments, the blocks are provided to the hash engine using an application programming interface (API) call, or other interface call, and identifies the portions of the samples to be hashed. For example, the request may include byte offsets indicating the particular portion of the sample to be hashed. Alternatively, the request may indicate a particular block or blocks (e.g., block 0, block 1, block 2, . . . , block–2, block–1, etc.) to be hashed.

Hash engine 108 implements one or more hashing algorithms (e.g., SHA256, SHA3, etc.) which it uses to compute the requested hashes, at numeral 4. At numeral 5, the hashes are compared to the entries maintained in local threat cache 110. As discussed, threat cache 110 can include a subset of threat hashes stored in threat database 111. For example, in some embodiments, threat cache is maintained in memory and includes the most recently checked threat entries and associated hashes. In some embodiments, threat cache 110 maintains the most frequently checked entries and hashes. Each entry in threat cache 110 or threat database 111 indicates for a given hash value, whether that hash value is associated with a known threat or if it is possibly associated with a known threat. For example, if that hash is only associated with known threat samples, then the entry may indicate "threat" while if that hash is associated with both known threats and clean files, then the entry may indicate "continue," indicating that further scanning may be needed to confirm whether that sample is malicious. By scanning a plurality of blocks, the likelihood of collisions of all of the hashed portions of a given clean sample to a known threat is unlikely. Therefore, if all of the portions indicate "continue," and the full hash needs to be computed, it is likely because the full hash is either a known threat or a known clean sample (e.g., on a safe list).

If the hash is not found in the local threat cache 110, then a call can be made to threat database 111 to check whether the hash is associated with any known threats, at numeral 6. In some embodiments, to reduce the cost associated with network calls to the threat database 111, multiple hashes may be batched and sent together. Threat database 111 may be implemented as a database service 113 or other storage service provided by provider network 100. As discussed, the threat database 111 includes hashes of all known threats and may therefore include trillions of entries. The hashes received from the threat scanning manager 104 can be checked against the entries of the threat database and any resulting matching entries can be returned. In some embodiments, the threat cache 110 can then be updated to include these entries as they were recently accessed. If a known threat is identified then the threat scanning service can isolate the sample, alert another user or system that a malicious sample has been identified, or take other action associated with a threat identification.

Figure 2:
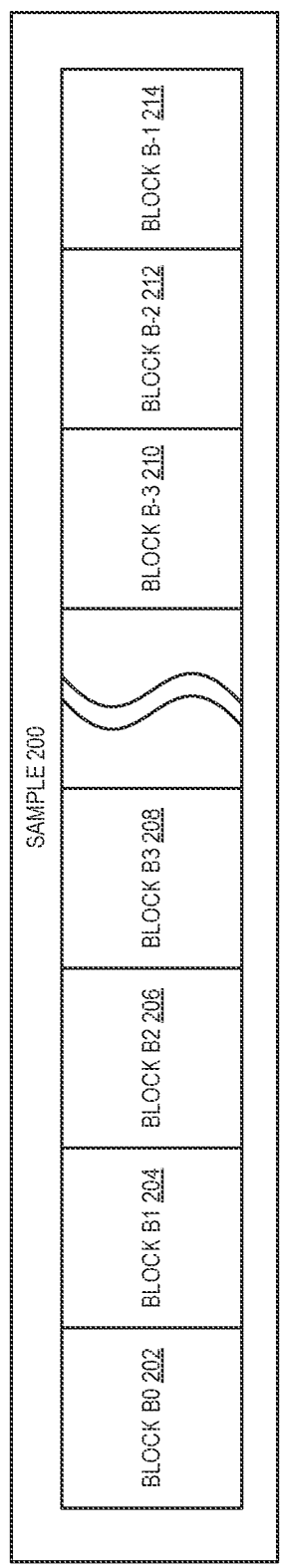
FIG. 2 is a diagram illustrating an example of sample blocks according to some embodiments.

FIG. 2 is a diagram illustrating an example of sample blocks according to some embodiments. As shown in FIG. 2, a given sample 200 is divided into a plurality of blocks. Starting at the beginning of the sample with block B0 202 and ending at the end of the sample with block B–1 214. Depending on the size of the sample, different samples may have different numbers of blocks. For example, a sample having a size equal to or smaller than the size of B0 202 may only include block B0, while larger samples may include additional blocks. In some embodiments, each block is of equal size. Alternatively, the sizes of the blocks may vary depending on their position. For example, block B0 202 may include up to 4096 bytes and block B1 204 may include up to 8192 bytes following B0 202. Block B2 206 may include up to 16386 bytes following block B1. Similarly, block B–1 214 can include the last 4096 bytes of the sample 200 and block B–2 212 can include up to 8192 bytes preceding block B–1. In various embodiments, the block sizes may vary from those described above. Additionally, in some embodiments more or fewer blocks may be used. For example, in some embodiments, block B3 208 and/or block B–3 210 may be used for hashing, depending on the size of the sample.

Figure 3:
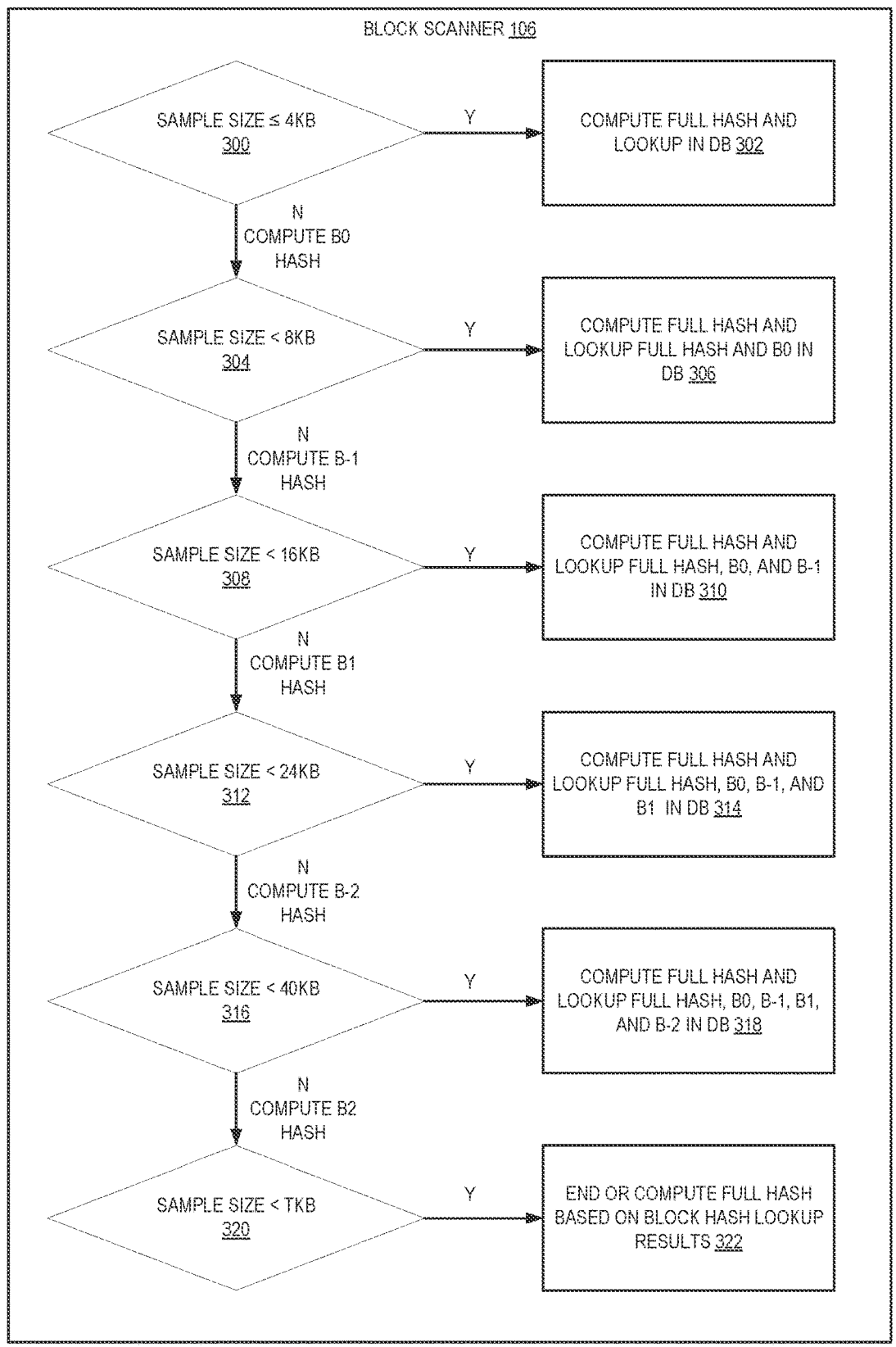
FIG. 3 is a diagram illustrating an example of block scanning logic implemented by a block scanner according to some embodiments.

FIG. 3 is a diagram illustrating an example of block scanning logic implemented by a block scanner according to some embodiments. As discussed above, block scanner 106 can selectively identify portions (e.g., blocks) of a sample to be hashed. This may depend on the size of the sample. For example, the order in which blocks are hashed may be determined from the size of the sample based on block scanning logic implemented by the block scanner 106. Although the example of block scanning logic illustrated in FIG. 3 is described with respect to specific size thresholds as determining how many, and which, blocks are hashed, this is only for ease of explanation and not intended to be limiting. In various embodiments, different (e.g., larger or smaller, more or fewer, etc.) size values may be used in a particular implementation of block scanning logic.

In the example of FIG. 3, when a new sample is obtained, the block scanner can determine at 300 whether the sample size is less than or equal to 4 KB. If so, then the block scanner 106 can provide the sample to the hash engine 108 to compute the full hash and lookup the result in the threat database, as shown at 302. As such, for samples smaller or equal to 4 KB, the full hash is computed for the sample and compared to the threat database to determine if it corresponds to a known threat or excluded item. If the sample is larger than 4 KB, then a hash is computed of block B0 by the hash engine and processing moves on to 304. Next, the block scanner determines whether the sample size is less than 8 KB, at 304. If so, then the block scanner can provider the sample to the hash engine to compute the full hash of the sample. The full hash and the hash of B0 are then compared to the threat database, as shown at 306. As such, for samples smaller than 8 KB, the full hash and the B0 hash are compared to the threat database to identify potential threats or excluded items. If the sample is 8 KB or larger, then a hash is computed for block B-1. As such, for samples larger than 8 KB, at least two blocks are hashed: the first block B0 and the last block B-1. Processing then moves on to 308.

Subsequently, the block scanner determines if the sample size is less than 16 KB. If so, then the block scanner can provide the sample to the hash engine to compute the full hash of the sample, and the full hash, the hash of B0 and the hash of B-1 are looked up in the threat database, at 310. If not, then a hash is computed for block B1 of the sample. As such, for samples larger than 16 KB, at least three blocks are hashed: the first block B0, the second block B1, and the last block B-1. Processing then moves on to 312. At 312, the block scanner 106 determines whether the sample size is less than 24 KB. If so, then the block scanner can provide the sample to the hash engine to compute the full hash of the sample, and the full hash, the hash of B0, the hash of B-1, and the hash of B1 are looked up in the threat database, at 314. If not, then a hash is computed for block B-2 of the sample. As such, for samples larger than 24 KB, at least four blocks are hashed: the first block B0, the second block B1, the next to last block B-2, and the last block B-1. Processing then moves on to 316. At 316, the block scanner 106 determines whether the sample size is less than 40 KB. If so, then the block scanner can provide the sample to the hash engine to compute the full hash of the sample, and the full hash, the hash of B0, the hash of B-1, the hash of B1, and the hash of B-2 are looked up in the threat database, at 318. If not, then a hash is computed for block B2 of the sample. As such, for samples larger than 40 KB, at least five blocks are hashed: the first block B0, the second block B1, the third block B2, the next to last block B-2, and the last block B-1. Processing then moves on to 320.

At 320, the block scanner 106 can determine whether the sample is larger than a threshold size (TKB). In some embodiments, the threshold size is defined as a sample size above which the full hash of the sample should not be automatically computed. In some embodiments, the threshold size is determined by deducting from the sample pre-caching size the size of B-1 and B-2 combined. Therefore if 96 KB is the threshold pre-caching size, then the threshold value would be TKB=96 KB-4 KB-8 KB=84 KB. Alternative sizes may also be implemented. For example, in some embodiments, the threshold size is 192 KB. As shown in FIG. 3, once 320 has been reached, at least five blocks have been hashed for the sample: the first block B0, the second block B1, the third block B2, the next to last block B-2, and the last block B-1. At 322, these blocks can be looked-up in the threat database. If the hash for each of these blocks is associated with a "continue" value in the threat database, then the full hash of the sample is computed and checked against the threat database. While the hash of a given block may be included in a threat (e.g., collide) it is unlikely that all five collide. therefore, if all five do collide with a known threat or exclusion in the threat database, then there is a high degree of certainty that the whole hash will match a known threat or exclusion. However, if all five are not associated with the value "continue" or "threat" then scanning can move on to the next sample, as it is unlikely that the sample represents a threat. This minimizes the number of full file hashes of large files that need to be computed, therefore saving resources.

Figure 4:
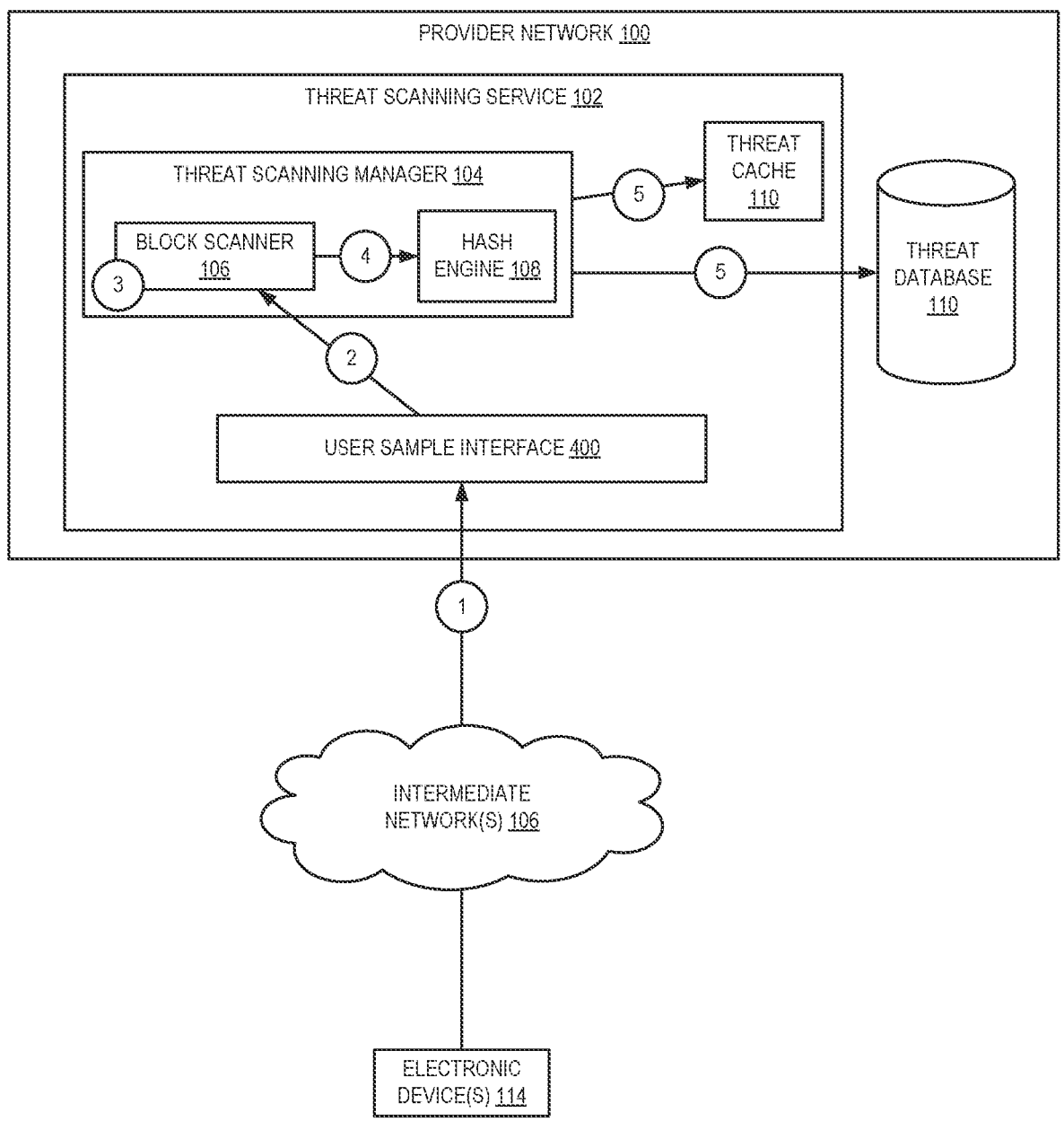
FIG. 4 is a diagram illustrating an environment for user-submitted samples to a hash based flexible threat scanning service according to some embodiments.

FIG. 4 is a diagram illustrating an environment for user-submitted samples to a hash based flexible threat scanning service according to some embodiments. The threat database 110 can include entries that are obtained from one or more third party security services. These third parties identify malicious samples and compute hashes which are then added to the threat database 110. However, errors introduced by third party services can lead to inaccurate results. Likewise, new samples developed by a customer may match to existing entries leading to false positives. In such cases, the threat scanning service and/or a customer may wish to add to an exclusion list (e.g., safe list). The exclusion list may be included in threat database 110 and can be associated with hashes which correspond to samples that known to be clean.

At numeral 1, a user using electronic device 114 can send a request to add a sample to the exclusion list. The request can be received by user sample interface 400, which may be an API, console, or other user interface. The user sample interface 400 can provide the sample to block scanner 106 at numeral 2. Block scanner 106 can then perform the same or similar scanning logic as described above to determine whether one or more blocks of the sample are to be hashed, depending on the size of the sample, at numeral 3. At numeral 4, the sample and one or more blocks, if any, identified by the block scanner are provided to the hash generator to compute their corresponding hashes. At numeral 5, the resulting hashes are added to the local threat cache and/or the threat database and associated with a value representing that this sample is an exclusion.

Similar processing may also be performed if the user or threat scanning service were to identify a sample that they believe to be malicious. For example, at numeral 1, a user using electronic device 114 can send a request to add a sample to the threat database as a malicious sample. The request can be received by user sample interface 400, which provides the sample to block scanner 106 at numeral 2. Block scanner 106 can then perform the same or similar scanning logic as described above to determine whether one or more blocks of the sample are to be hashed, depending on the size of the sample, at numeral 3. At numeral 4, the sample and one or more blocks, if any, identified by the block scanner are provided to the hash generator to compute their corresponding hashes. At numeral 5, the resulting hashes are added to the local threat cache and/or the threat database and associated with a value representing that this sample is a threat.

Figure 5:
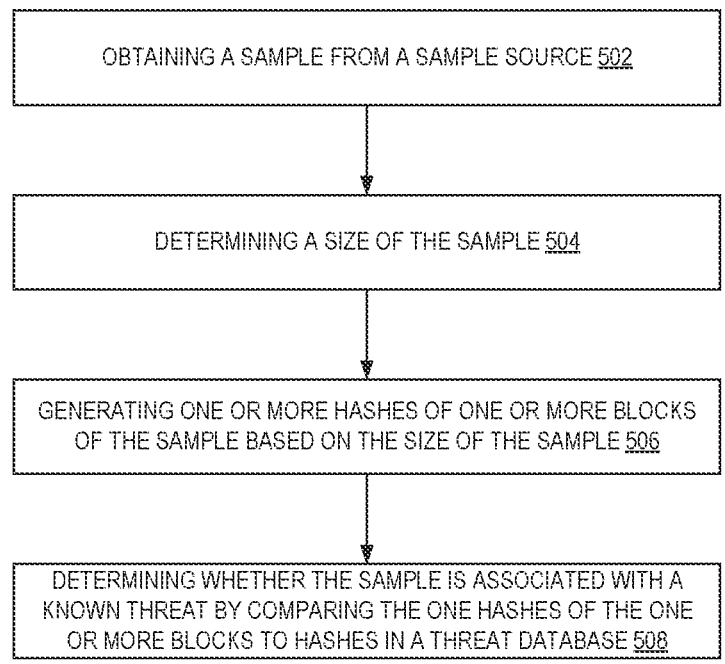
FIG. 5 is a flow diagram illustrating operations of a method for hash based flexible threat scanning according to some embodiments.

FIG. 5 is a flow diagram illustrating operations 500 of a method for hash based flexible threat scanning according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by threat scanning service 102 of the other figures.

The operations 500 include, at block 502, obtaining a sample from a sample source. In some embodiments, the sample source includes one or more of a file from a storage service, a memory dump, a disk image, or an ISO container. The operations 500 further include, at block 504, determining a size of the sample. As discussed, in some embodiments, the number and/or locations of the blocks to be hashed may vary depending on the size of the sample. For example, one size sample may indicate that a first block of the sample is to be hashed, while a larger sample size may indicate that multiple blocks, including one or more blocks from the beginning of the sample and one or more blocks from the end of the sample are to be hashed.

The operations 500 further include, at block 506, generating one or more hashes of one or more blocks of the sample based on the size of the sample. In some embodiments, generating one or more hashes include generating a plurality of hashes of a plurality of blocks of the sample when the size of the sample is greater than a threshold size, the plurality of blocks including one or more blocks from a beginning of the sample and one or more blocks from an end of the sample. In some embodiments, the one or more blocks from the beginning of the sample include a first block, a second block, and a third block, and wherein the one or more blocks from the end of the sample include a last block and a next to last block. In some embodiments, generating one or more hashes includes generating a hash of a first block of the sample and a full hash of the sample when the size of the sample is less than a first size. In some embodiments, generating one or more hashes includes generating a hash of a first block of the sample, a last block of the sample, and a full hash of the sample when the size of the sample is greater than the first size and less than a second size. In some embodiments, generating one or more hashes includes generating a hash of a first block of the sample, a second block of the sample, a last block of the sample, and a full hash of the sample when the size of the sample is greater than the second size and less than a third size.

The operations 500 further include, at block 508, determining whether the sample is associated with a known threat by comparing the one hashes of the one or more blocks to hashes in a threat database. In some embodiments, determining whether the sample is associated with a known threat may include determining each of the plurality of hashes is associated with an entry in the threat database indicating a possible threat or exclusion, generating a full hash of the sample, and comparing the full hash of the sample to the hashes in the threat database to identify the sample as a threat or an exclusion.

In some embodiments, the operations further include receiving a second sample associated with a threat label or an exclusion label, generating one or more hashes of one or more blocks of the second sample based on a size of the second sample, generating a full hash of the second sample, and adding the one or more hashes of the one or more blocks of the second sample and the full hash of the second sample to the threat database associated with the threat label or the exclusion label.

In some embodiments, the operations include obtaining a file to be scanned from a storage volume associated with a host in a provider network, determining a size of the file to be scanned is greater than a threshold size, identifying a plurality of blocks of the file to be scanned based on the size of the file, the plurality of blocks including portions of the file from a beginning of the file and from an end of the file, generating a plurality of hashes of the plurality of blocks, looking up the plurality of hashes in a threat database to obtain a plurality of matching results, and determining whether to generate a full hash of the file based on the plurality of matching results.

In some embodiments, determining whether to generate a full hash of the file based on the plurality of matching results, further includes determining each of the plurality of matching results indicates a corresponding block is associated with a possible threat, generating the full hash of the file, and comparing the full hash of the file to the threat database to determine whether the file is a known threat. In some embodiments, the plurality of blocks include blocks of different sizes.

Figure 6:
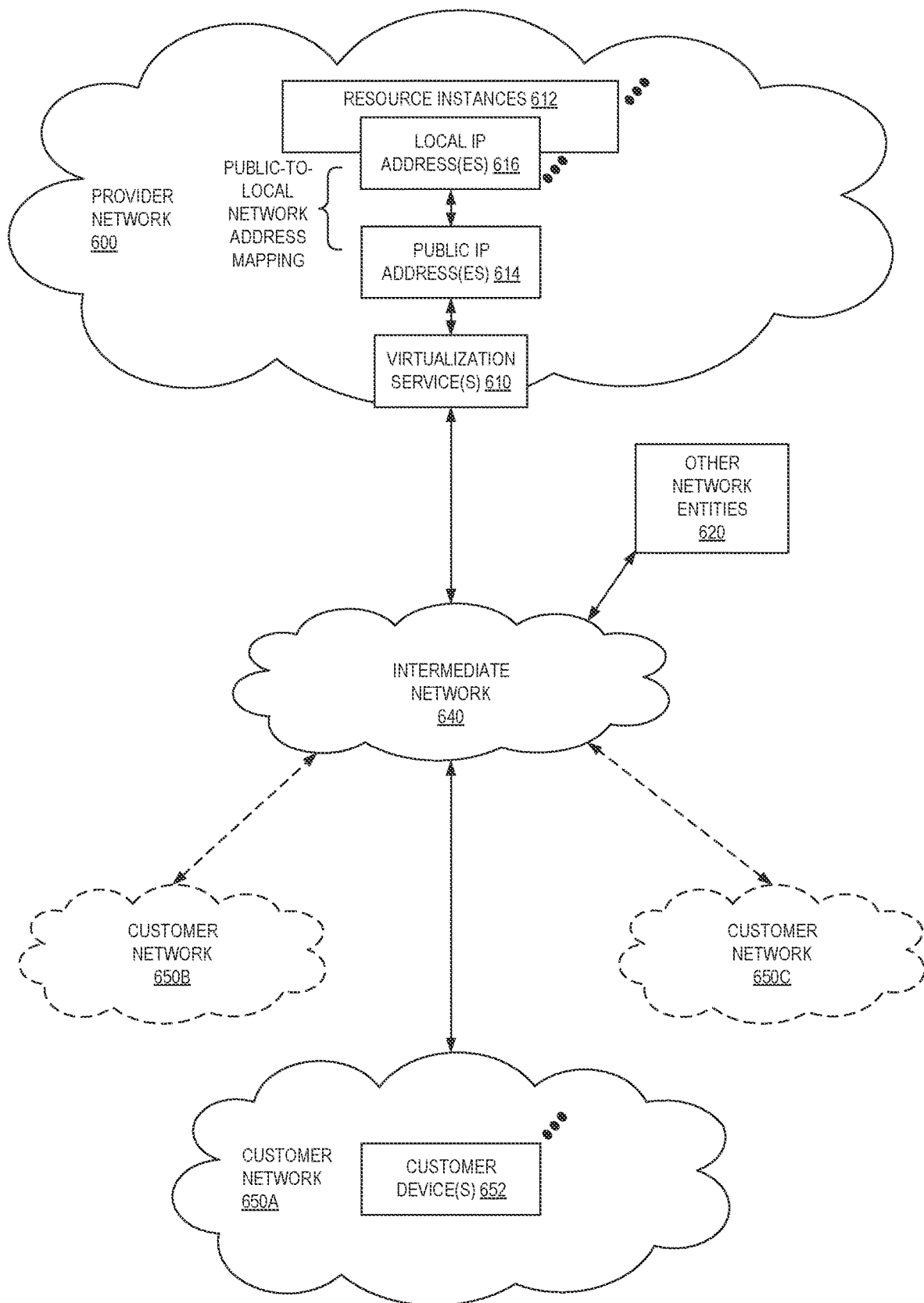
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
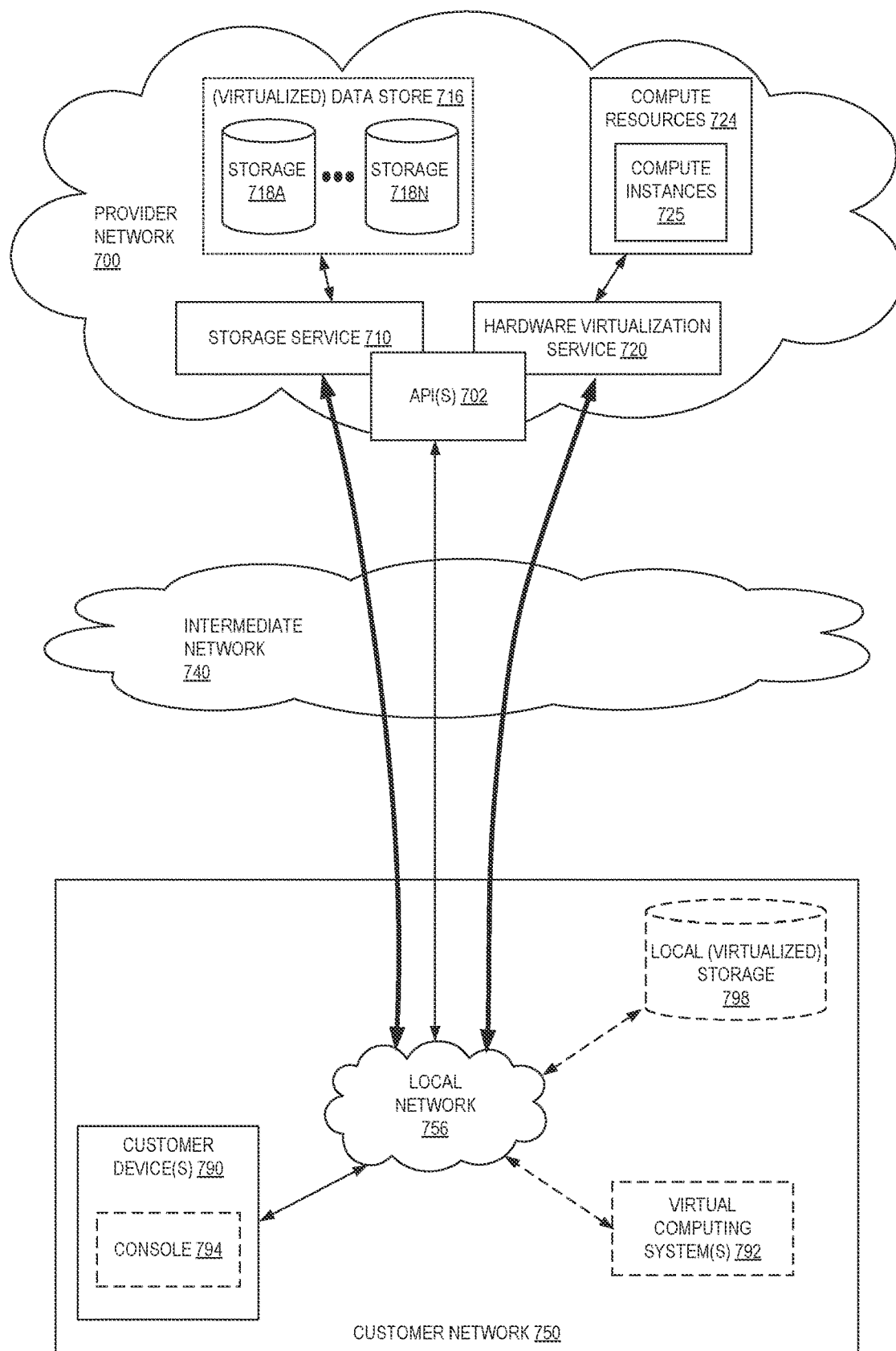
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
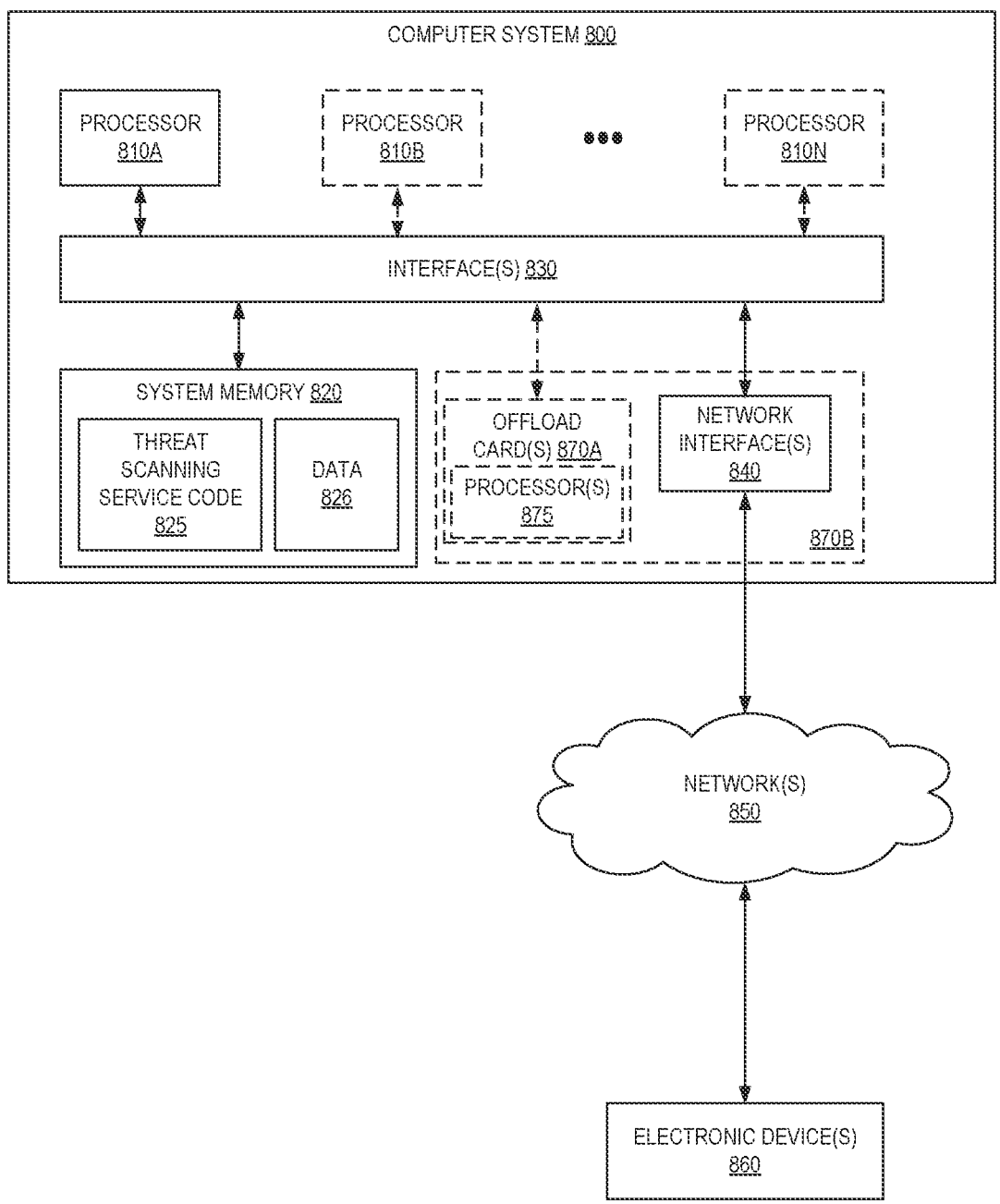
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as threat scanning service code 825 (e.g., executable to implement, in whole or in part, the threat scanning service 102) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining a sample from a sample source;
determining a size of the sample;
determining, based on the size of the sample, that only particular blocks of the sample are to be hashed, wherein the particular blocks include one or more blocks from a beginning of the sample, including a first block, a second block, and a third block, and one or more blocks from an end of the sample, including a last block and a next-to-last block;

generating hashes of the particular blocks of the sample based on the determining that only particular blocks of the sample are to be hashed; and determining whether the sample is associated with a known threat by comparing the hashes of the particular blocks to hashes in a threat database.

2. The computer-implemented method of claim 1, wherein determining whether the sample is associated with a known threat by comparing the hashes of the particular blocks to hashes in a threat database, further comprises:

determining each of the hashes is associated with an entry in the threat database indicating a possible threat or exclusion;

generating a full hash of the sample; and comparing the full hash of the sample to the hashes in the threat database to identify the sample as a threat or an exclusion.

3. The computer-implemented method of claim 1, wherein determining, based on the size of the sample, that only particular blocks of the sample are to be hashed comprises determining the size of the sample is greater than a threshold size.

4. The computer-implemented method of claim 3, wherein the threshold size is a sample size above which a full hash of the sample should not be automatically computed.

5. The computer-implemented method of claim 1, wherein the particular blocks include blocks of different sizes.

6. The computer-implemented method of claim 1, further comprising:

receiving a second sample associated with a threat label or an exclusion label;

generating one or more hashes of one or more blocks of the second sample based on a size of the second sample;

generating a full hash of the second sample; and adding the one or more hashes of the one or more blocks of the second sample and the full hash of the second sample to the threat database associated with the threat label or the exclusion label.

7. The computer-implemented method of claim 1, wherein the sample source includes one or more of a storage service, a memory dump, a disk image, or an ISO container.

8. A system comprising:

a first one or more electronic devices to implement a database service in a multi-tenant provider network; and a second one or more electronic devices to implement a threat scanning service in the multi-tenant provider network, the threat scanning service including instructions that upon execution by one or more processors cause the threat scanning service to:

obtain a sample from a sample source;

determine a size of the sample;

determine, based on the size of the sample, that only particular blocks of the sample are to be hashed, wherein the particular blocks include one or more blocks from a beginning of the sample, including a first block, a second block, and a third block, and one or more blocks from an end of the sample, including a last block and a next-to-last block;

generate hashes of the particular blocks of the sample based on the determining that only particular blocks of the sample are to be hashed; and determine whether the sample is associated with a known threat by comparing the hashes of the particular blocks to hashes in a threat database of the database service.

9. The system of claim 8, wherein to determine whether the sample is associated with a known threat by comparing the hashes of the particular blocks to hashes in a threat database, the instructions, when executed by the one or more processors, further cause the threat scanning service to:

determine each of the plurality of hashes is associated with an entry in the threat database indicating a possible threat or exclusion;

generate a full hash of the sample; and compare the full hash of the sample to the hashes in the threat database to identify the sample as a threat or an exclusion.

10. The system of claim 8, wherein determining, based on the size of the sample, that only particular blocks of the sample are to be hashed comprises determining the size of the sample is greater than a threshold size.

11. The system of claim 10, wherein the threshold size is a sample size above which a full hash of the sample should not be automatically computed.

12. The system of claim 8, wherein the particular blocks include blocks of different sizes.

13. The system of claim 8, wherein the instructions, when executed by the one or more processors, further cause the threat scanning service to:

receive a second sample associated with a threat label or an exclusion label;

generate one or more hashes of one or more blocks of the second sample based on a size of the second sample;

generate a full hash of the second sample; and add the one or more hashes of the one or more blocks of the second sample and the full hash of the second sample to the threat database associated with the threat label or the exclusion label.

\* \* \* \* \*